Patented Dec. 19, 1939

2,183,625

UNITED STATES PATENT OFFICE 2,183,625

REDUCTION PRODUCTS OF BZ-2, BZ-2'-DI-HYDROXYDIBENZANTHRONE AND PROCESS FOR PREPARING THE SAME

Otto Stallmann, Bridgeton, N. J., assignor to E. I. du Pont de Nemours & Company, Wilmington, Del., a corporation of Delaware No Drawing. Application May 25, 1938, Serial No. 209,990

5 Claims. (Cl. 260—355)

This invention relates to the preparation of new and valuable stable reduction products of Bz-2,Bz-2'-dihydroxydibenzanthrones which are in themselves useful as dyestuffs and as intermediates for the preparation of desirable color bodies.

In British Patent 413,344 the preparation of leuco derivatives of indigo and thioindigo has been disclosed which are somewhat more stable to air oxidation than their ordinary leuco derivatives, and which are convertible to the common leuco compound with much less reducing agent than is required for the parent vat color. It has been more recently found that new stable leuco derivatives of Bz-2,Bz-2'-dialkoxydibenzanthrones can be prepared which are water insoluble and which can be reconverted to the common leuco by heating in alkaline media without the use of reducing agents (see copending application Serial No. 186,750).

It is also known that the simple benzanthrone may be converted to a stable reduction product when treated with alkaline hydrosulfite solution at high temperatures with the formation of what is generally believed to be a hydrogenated compound (Ber. 44, 1666). It is also known that indanthrone (N,N'-dihydroanthraquinoneazine) may be reduced with alkaline hydrosulfite at the boil to anthranol-like bodies (see Ber. 40, p. 924 et seq.). These latter compounds, however, have no particular commercial value so far as present knowledge is concerned.

It is an object of this invention to prepare a new stable reduction product of Bz-2,Bz-2'-dihydroxydibenzanthrone which dyes cotton from the ordinary alkaline hydrosulfite vat in olive shades and which serves as an intermediate for the preparation of valuable color bodies and dyestuffs.

It is a further object of the invention to prepare a new stable reduction derivative of Bz-2,Bz-2'-dihydroxydibenzanthrone which on alkylation or esterification gives color bodies which are valuable in the coloration of oils, fats, waxes, artificial resins, etc., in colors which exhibit desirable strong fluorescence.

I have found that new and valuable stable reduction products of Bz-2,Bz-2'-dihydroxydibenzanthrone can be prepared by subjecting the Bz-2,Bz-2'-dihydroxydibenzanthrone to the action of sodium hydrosulfite under carefully controlled conditions. Where the alkalinity of the ordinary alkaline hydrosulfite vat of Bz-2,Bz-2'-dihydroxydibenzanthrone is reduced to a pH value of 12 or below and held at from 60 to 90° C. the stable leuco derivative may be precipitated in the form of the monoalkali-metal salt as a highly crystalline product. The alkalinity of the vat may be reduced by the very slow addition of a weak acid, an acid salt, carbon dioxide or sulfur dioxide gas, care being taken in all cases that the alkalinity is not reduced too rapidly or to a point where the common leuco compound precipitates. In general, the alkalinity of the vat should be maintained between a pH of 9 to 12 within which limits the monoalkali-metal salt of the reduction product is precipitated out completely upon prolonged heating of the solution, under agitation, at temperatures of from 60 to 90° C. By the use of sulfur dioxide or sodium bisulfite the excess of caustic in the vat is converted to the alkali-metal sulfite, whereby the alkalinity is reduced to the required pH value. The monoalkali-metal salt of this reduction product when dry is a greenish black crystalline product which dyes cotton from a blue alkaline hydrosulfite vat in olive shades. It is not reconvertible to the common leuco form or to the parent dihydroxybenzanthrone with alkalies or alkaline reducing agents. It gives a bright blue color when dissolved in concentrated sulfuric acid from which it may again be precipitated without decomposition, even after heating in concentrated sulfuric acid to 100° C., as distinguished from the dihydroxydibenzanthrone and its known reduction product which dissolve in sulfuric acid with a red-violet color. It may be converted to the free stable hydroxy derivative by acidification and this free hydroxy compound which is brownish black in color is insoluble in water and dyes cotton in similar shades. It may be used as the free hydroxy compound or the alkali-metal salt in subsequent reactions or as a vat dyestuff. According to my preferred process, 1 part of Bz-2,Bz-2'-dihydroxydibenzanthrone is vatted in 30 to 50 parts of water using 0.75 to 1.5 parts of sodium hydroxide and 0.75 to 1.5 parts of sodium hydrosulfite and heating to 50 to 60° C. until a clear deep blue colored vat is obtained. The alkalinity is then preferably reduced by the addition of sodium bisulfite to a pH of from 9 to 12, at which point the common leuco of the dihydroxydibenzanthrone remains completely dissolved. The vat is then heated at temperatures preferably from 60 to 90° C. until the precipitation of dark color crystals is completed or until a test portion of the suspension dyes cotton from a blue alkaline hydrosulfite vat in olive shades which turn bluish gray on treatment with acids, as distinguished from the bright yellowish green shades of the parent dihydroxydibenzanthrone which turns to a bright blue on treatment with acids.

When the color has been completely precipitated it is filtered off and the cake is washed with a limited amount of water since the sodium salt exhibits some slight solubility in salt free water. The monosodium salt may be purified by a revatting and salting procedure according to known methods for vat dyestuffs. The product may also be purified and obtained as the free hydroxy compound by crystallization from concentrated sulfuric acid.

The product may be converted to valuable color bodies by further alkylation or esterification, as more particularly described in copending applications Serial Nos. 209,991 and 209,993 filed May 25, 1938. This new stable reduction derivative of Bz-2,Bz-2'-dihydroxydibenzanthrone may be brominated under controlled conditions to give the mono- or dibromination products which likewise dye in olive shades similar to those of the unsubstituted product. These brominated products are also useful as intermediates for the preparation of color bodies for oils, gasolines, etc., and for the preparation of novel vat dyestuffs.

The following examples are given to illustrate the invention more fully. The parts used are by weight.

Example 1

247 parts of a filter press cake containing 100 parts of technically pure Bz-2,Bz-2'-dihydroxydibenzanthrone are suspended in 5000 parts of warm water, and 100 parts of sodium hydroxide are added. After adjusting the temperature to 55° C., 100 parts of sodium hydrosulfite are added and the suspension is stirred for one-half hour at 55 to 60° C. until a clear, deep blue colored vat is obtained. 25 parts of sodium hydrosulfite and 100 parts of sodium bisulfite are slowly added while adjusting the temperature to 65° C. The vat is then treated with a very slow and uniform stream of carbon dioxide gas for a total of four hours, until the precipitation of a greenish black colored crystalline monosodium salt of the novel stable reduction product is completed. It is then filtered off and the filter cake is washed with a total of 2000 parts of water, and dried.

The pure monosodium salt thus obtained in the form of black crystals is very stable towards oxidizing agents. It can be vatted with alkaline hydrosulfite to give a deep blue colored vat, from which cotton is dyed in olive shades. Similar shades are obtained, when the product is printed by the conventional printing methods involving the use of "Sulfoxite C" (a commercial brand of a stable formaldehyde-hydrosulfite condensation product) and alkali carbonate.

Example 2

100 parts of dry purified dihydroxydibenzanthrone in powder form are suspended in 4000 parts of water containing 150 parts of sodium hydroxide in solution. 150 parts of sodium hydrosulfite are added to the suspension at 60° C. and the vat is stirred at 60 to 65° C. for one-half hour and then filtered at 60° C. 150 parts of sodium bisulfite are then added and the clear filtrate is treated with a very slow and uniform stream of carbon dioxide gas while the mass is stirred at 65 to 70° C. for four hours, or until the precipitation of the sodium salt of the stable reduction product is complete. The precipitate is filtered off and the cake washed with 1000 parts of cold water. The dry product is identical in properties with those of the product described in the previous example.

The product may be further purified by suspending it in 3000 parts of warm water containing 80 parts of sodium hydroxide. 100 parts of sodium hydrosulfite are stirred into the suspension at 65° C. and the vat is kept at 65 to 70° C. for one-half hour, or until a clear, blue vat is obtained. 800 parts of common salt are then added slowly within one hour and the precipitate is filtered off at 60° C. The purified product thus obtained as filter cake is found to dye in the same olive shades, although slightly brighter and showing somewhat less change in diluted acid in comparison with the crude product.

Example 3

The precipitated monosodium salt of the stable reduction product from either of the above examples may be converted to the free hydroxy compound by suspending the cake in 3000 parts of water and adding 50 parts of 73% sulfuric acid slowly to the stirred suspension, which is heated to 60° C. The dull brownish colored precipitate is filtered off, washed acid-free with cold water and dried at 100° C. The product, obtained as a black powder, is found to be practically free from ash and is the free hydroxy compound of the stable reduction product. It dyes and prints cotton in olive shades identical with those obtained from the product of Example 1 or 2.

The same compound is obtained when the suspension of the monosodium salt in water is acidified with 50 parts of glacial acetic acid and the precipitate filtered off, and the resulting cake is washed free from sodium acetate with water and dried at 100° C.

The hydroxy compound thus obtained is soluble in concentrated sulfuric acid with a deep bright blue coloration, which remains stable even when the solution is heated to 60 to 70° C. for several hours.

However, when a very strong oxidizing agent is added, such as for instance chromic acid, sodium chlorate, sodium persulfate, sodium perborate, or hydrogen peroxide, the blue color changes to a violet-red and the reaction product is found to dye cotton from a blue vat in bluish green shades which change to a grayish blue in diluted mineral acids.

The crude hydroxy derivative of the stable reduction product as obtained above may be purified as follows:

15 parts of the dry compound are dissolved in 150 parts of 96% sulfuric acid by stirring the charge for 8 hours at 25° C. The deep blue colored solution is then warmed to 40° C. and 100 parts of a 78% sulfuric acid are dropped into the solution within 3 hours at 35 to 40° C. The well defined needles thus precipitated are filtered off and the cake is washed with 100 parts of 78% sulfuric acid and then with cold water until free from acid. The cake is dried at 100° C. The dry pure crystals obtained possess all characteristic properties of the novel parent reduction product, as described in the previous examples, except that the dyeing and printing shades are somewhat brighter and slightly stronger in shade and show less change in diluted alkalies and acids in comparison with those obtained from the crude compound.

Example 4

100 parts of purified dihydroxydibenzanthrone are vatted for one hour at 65 to 70° C. with 4000 parts of water, 120 parts of sodium hydroxide, and 150 parts of sodium hydrosulfite. A 37% solution containing 200 parts of sodium bisulfite is then dropped into the vat very slowly and uniformly under agitation, at 70 to 72° C., within a period of three hours and the mass is further stirred at 70° C. for five hours, until the crystalline monosodium salt of the stable reduction product is completely precipitated out of solution.

The product is filtered off, the cake suspended in 3000 parts of warm water and the suspension acidified with 50 parts of glacial acetic acid at 50° C.

The hydroxy compound thus obtained is filtered off. It is identical in properties with the corresponding crude product of the previous examples.

Example 5

100 parts (dry equivalent) of a filter press cake of technical Bz-2,Bz-2'-dihydroxydibenzanthrone are suspended in 5000 parts of warm water, and 100 parts of sodium hydroxide and 120 parts of sodium hydrosulfite are added at 60° C. The vat is stirred for one hour at 60 to 65° C. and then heated to 70° C. 150 parts of sodium bisulfite are now added and agitation is continued at 70 to 75° C. until all the original color is converted into a crystalline greenish black colored precipitate, which is filtered off and washed free from caustic.

The cake is then suspended in 3000 parts of cold water and 50 parts of 100% acetic acid are added. After stirring for one hour, the brownish colored precipitate is filtered off and the cake is washed with water until free from sodium acetate and then dried at 100° C.

The dry hydroxy compound is pulverized to a black powder which dyes cotton from a blue vat in olive shades. The powder is stable, even on prolonged standing.

Potassium hydroxide and potassium bisulfite may be employed in equivalent amounts to give the potassium salt. This potassium salt is preferably obtained by treatment of the free hydroxy stable reduction product with an excess of potassium carbonate or potassium hydroxide.

This new stable reduction derivative of Bz-2,Bz-2' - dihydroxydibenzanthrone may be converted to valuable color bodies upon alkylation by the procedure generally employed for the alkylation of dihydroxydibenzanthrone.

Example 6

The washed filter cake from Example 1 or 2 is milled to a smooth color paste with water and 73 parts of potassium carbonate are added. The paste is dried at 100° C. in vacuo and pulverized. 50 parts of the dry pulverized product thus obtained (representing the monosodium salt of the stable reduction product from dihydroxydibenzanthrone in admixture with potassium carbonate) are suspended in 800 parts of dry nitrobenzene. 100 parts of dry potassium carbonate are added and the mass is heated to 160° C. 60 parts of dimethyl sulfate are dropped into the mass under agitation over a period of two hours, at 160 to 170° C. After stirring for another two hours at this temperature, the suspension is cooled to 100° C. and filtered at this temperature.

The deep red colored filtrate is steam distilled free from nitrobenzene. The residual solid product is filtered off, dried at 100° C. and then pulverized. It may be purified as follows.

10 parts are dissolved in 500 parts of "Solvent Naphtha", the solution is filtered at room temperature and the filtrate is evaporated to dryness. The purified compound is soluble in oil, gasoline, and waxes, with a reddish color in transmitted light, showing a very strong and bright reddish yellow fluorescence in reflected light.

The product is not vattable in alkaline hydrosulfite solutions at 40 to 60° C. but after prolonged boiling in a strongly alkaline hydrosulfite solution a small part of the product appears to become soluble, forming a blue vat from which cotton is dyed in very weak and dull bluish gray to bluish green shades.

In all inert organic solvents and in pyridine this methylated product is soluble with a deep red coloration. Oil solutions of the product remain unchanged in fluorescence when heated to 150° C. for two hours.

Example 7

50 parts of the same dry potassium carbonate containing starting material as was used in the previous example are suspended in 500 parts of dry nitrobenzene. 35 parts of potassium carbonate are added and the suspension is heated to 160° C. under agitation. 75 parts of diethyl sulfate are then dropped into the mass over a period of two hours and heating is continued at 160 to 165° C. for a total of twelve hours. The ethylation mass is cooled to 25° C. and filtered. The filtrate is steam distilled free from nitrobenzene and the water layer is poured off the semi-solid residue, which is dried at 100° C.

The crude red colored product thus obtained may be further purified by dissolving in cold benzene, filtering, and evaporating the deep red colored filtrate to dryness.

The purified ethyl ether is equally as strong in fluorescence but of a somewhat redder and duller shade in reflected light when dissolved in oil, in comparison with the purified methylated product of the previous example.

The solubility and stability properties of the ethylated product and its color in solutions of organic solvents are similar to those of the corresponding methylated product.

Example 8

25 parts of the dry alkali salt of the stable reduction product, obtained by adding 200 parts of potassium carbonate to the washed filter cake of Example 1 or 2 and drying the product at 100° C. and pulverizing, are suspended in 200 parts of o-dichlorobenzene, containing 10 parts of fused pulverized sodium acetate in suspension. 50 parts of ethylene dibromide are then added and the mass is heated under agitation to reflux temperature (140° C.) for a total of fourteen hours while allowing the temperature to rise gradually to finally 165° C. (as the ethylene dibromide is being consumed in the reaction) and while allowing traces of water formed in the reaction to escape through an air condenser.

The mass is then cooled to 60° C. and filtered at this temperature. The deep red colored filtrate is steam distilled free from solvent and the residual water insoluble product is isolated by filtration and dried at 100° C. The dry product is found to give deep red colored solutions when dissolved in organic solvents or in oils where the product shows a similar fluorescence in reflected light and a somewhat bluer shade in transmitted light, in comparison with solutions obtained from the purified methylated and ethylated derivatives.

The novel reduction product of Bz-2,Bz-2'-dihydroxydibenzanthrone in the free hydroxy form may be halogenated to give mono- or dihalogen derivatives which are voluable as intermediates for the preparation of further color bodies and vat dyestuffs. The bromination of the stable reduction product (in the form of the free hydroxy derivative) in general gives well defined crystalline reaction products.

*Example 9*

25 parts of the hydroxy derivative of the stable reduction product from dihydroxydibenzanthrone (prepared according to Example 3) in the form of the filter cake are suspended in 750 parts of cold water and 33 parts of bromine are slowly added to the suspension, which is stirred for fourteen hours at room temperature. The precipitate is filtered off, the cake washed with water, and dried at 100° C. 28 parts of a monobromo derivative are thus obtained (13.15% bromine content).

When a similar aqueous bromination mass is heated (after stirring for fourteen hours cold) at the boil for two hours, a higher brominated reaction product (Br=18.38%) is obtained.

Both bromo derivatives dye cotton from a blue vat in olive shades, similar in shade and fastness properties to those obtained from the unbrominated stable reduction product.

*Example 10*

30 parts of the dry pulverized hydroxy derivative of the stable reduction product from dihydroxydibenzanthrone are dissolved in 600 parts of monohydrate at 15 to 20° C. and 30 parts of bromine are added slowly over a period of two hours at this temperature. 24 parts of sulfuryl chloride are then added and the solution is stirred at room temperature for fourteen hours.

The deep blue colored solution is then poured into 3000 parts of cold water, 60 parts of sodium bisulfite are added to the suspension in order to reduce any oxidized material, and the suspension is stirred for two hours at 50 to 60° C.

The precipitate is then filtered off and dried at 100° C., whereby 37 parts of a dibrominated derivative (Br=20.3%) are obtained which dye cotton from a blue vat in olive shades. 5 parts of this dry product may be methylated in 100 parts of nitrobenzene with 15 parts of dimethyl sulfate and 20 parts of potassium carbonate at 160 to 170° C.

The isolated methylated product contains 12.02% bromine. It dyes cotton from a blue vat in bright bluish green shades fast to alkalies and acids.

Bromination of the hydroxy derivative of the stable reduction product in concentrated sulfuric acid (98%) solutions, using 1.5 parts of bromine per 1.0 part of the dry product, gives a monobromo compound containing 13.54% bromine.

These bromination compounds may be further condensed with arylamines or they may be converted to mercaptan compounds by the known methods.

In the preparation of this new stable reduction product the alkalinity of the vat may be reduced by the addition of suitable weak acids, such as the lower aliphatic acids, or alkali-metal salts such as sodium hydrosulfite or sodium acid sulfate. It is important that reducing conditions be maintained in the vat for some time after the alkalinity of the vat has been adjusted to a pH of 9.0 to 12.0, for otherwise oxidation of the unstable leuco back to the parent ketonic color may occur.

In the preparation of this new stable leuco compound, it is desirable that relatively pure Bz-2,Bz-2'-dihydroxydibenzanthrone be employed. The degree of dilution and the amounts of caustic alkali and sodium hydrosulfite employed in the vatting of the dihydroxydibenzanthrone may be varied within wide limits. The amount of reducing agent, such as the sodium hydrosulfite, which should be used will depend in some degree upon the air oxidation to which the vat is exposed. Much larger quantities of sodium hydrosulfite or hydroxide than are disclosed in the examples may be employed, although when unnecessarily large amounts of sodium hydroxide are employed correspondingly large amounts of sodium bisulfite or other neutralizing agent must be used.

This new stable leuco derivative may be esterified with aliphatic acid chlorides in pyridine suspension, as more particularly described in copending application Serial No. 209,993 or condensed with alkylene oxides or other alkylating agents than those specifically described above. It may also be converted to a trisulfuric acid ester by reacting in the usual manner with pyridine sulfur trioxide compounds in pyridine solution. The sulfuric acid esters are water soluble and dye cotton in bright red shades which are regenerated with the usual acid oxidizing agent to the olive color of the original stable reduction product, as distinguished from the sulfuric acid esters of the ordinary leuco derivative which under similar treatment is reconverted to the parent ketonic dyestuff.

The monosodium salt, as well as the free hydroxy compound of this new stable reduction derivative, is quite insoluble in inert organic solvents, although in boiling naphthalene the free hydroxy compound shows some slight solubility, giving a deep red color.

I claim:

1. The process for preparing a stable reduction product of Bz-2,Bz-2'-dihydroxydibenzanthrone which comprises preparing an alkaline hydrosulfite vat of Bz-2,Bz-2'-dihydroxydibenzanthrone, carefully reducing the alkalinity of the vat to a pH of from 9 to 12 while maintaining the temperature of the vat at from 60 to 90° C., until the precipitation of the monoalkali-metal salt is completed.

2. The process for preparing a stable reduction product of Bz-2,Bz-2'-dihydroxydibenzanthrone which comprises preparing an alkaline hydrosulfite vat of Bz-2,Bz-2'-dihydroxydibenzanthrone, carefully reducing the alkalinity of the vat to a pH of from 9 to 12 while maintaining the temperature of the vat at from 60 to 90° C., until the precipitation of the monoalkali-metal salt is completed, filtering off the precipitated alkali metal salt of the stable reduction product of Bz-2,Bz-2'-dihydroxydibenzanthrone, treating the same with acid and filtering off the resulting brownish colored precipitate.

3. The alkali-metal salts of the stable reduction product of Bz-2,Bz-2'-dihydroxydibenzanthrone and the free hydroxy compound which are brownish black to greenish black crystalline solids in the isolated form, stable to air oxidation under normal atmospheric conditions, and which dye cotton from a blue alkaline hydrosulfite vat in olive shades; said compounds being soluble in concentrated sulfuric acid with a blue color from which the free hydroxy compound of the stable reduction product may be precipitated without decomposition; said compounds being identical with the compounds obtained by heating an alkaline hydrosulfite vat of Bz-2,Bz-2'-dihydroxydibenzanthrone, the alkalinity of which has been reduced to a pH value of from 9 to 12 at from 60 to 90° C.; and by isolating the resulting alkali-metal salt and treating the same with acids.

4. The alkali-metal salt of the stable reduction product of Bz-2,Bz-2'-dihydroxydibenzanthrone which in isolated form is a greenish black crystalline compound stable to air oxidation under ordinary atmospheric conditions and which dyes cotton from a blue alkaline hydrosulfite vat in olive shades; said compound being soluble in concentrated sulfuric acid with a blue color, from which the free hydroxy derivative may be precipitated without decomposition; said alkali-metal salt being identical with the product obtainable by heating an alkaline hydrosulfite vat of Bz-2,Bz-2'-dihydroxydibenzanthrone, the alkalinity of which has been reduced to a pH of from 9 to 12 at from 60 to 90° C. for a prolonged period of time.

5. The stable reduction product of Bz-2,Bz-2'-dihydroxydibenzanthrone is the free hydroxy form which on isolation is a brownish black crystalline solid stable to air oxidation under ordinary atmospheric conditions, which dyes cotton from a blue alkaline hydrosulfite vat in olive shades; said compound being soluble in concentrated sulfuric acid with a blue color from which it may be precipitated without decomposition; said compound being identical with the product obtainable by heating an alkaline hydrosulfite vat of Bz-2,Bz-2'-dihydroxydibenzanthrone, the alkalinity of which has been reduced to a pH value of from 9 to 12 at from 60 to 90° C. until the monoalkali-metal salt has been completely precipitated, filtering off the alkali-metal salt and heating the same with acids at a temperature of about 60° C.

OTTO STALLMANN.